March 2, 1954
L. G. PLANT
2,670,588
ROTARY SIDE DELIVERY RAKE
Filed June 16, 1950
2 Sheets-Sheet 1
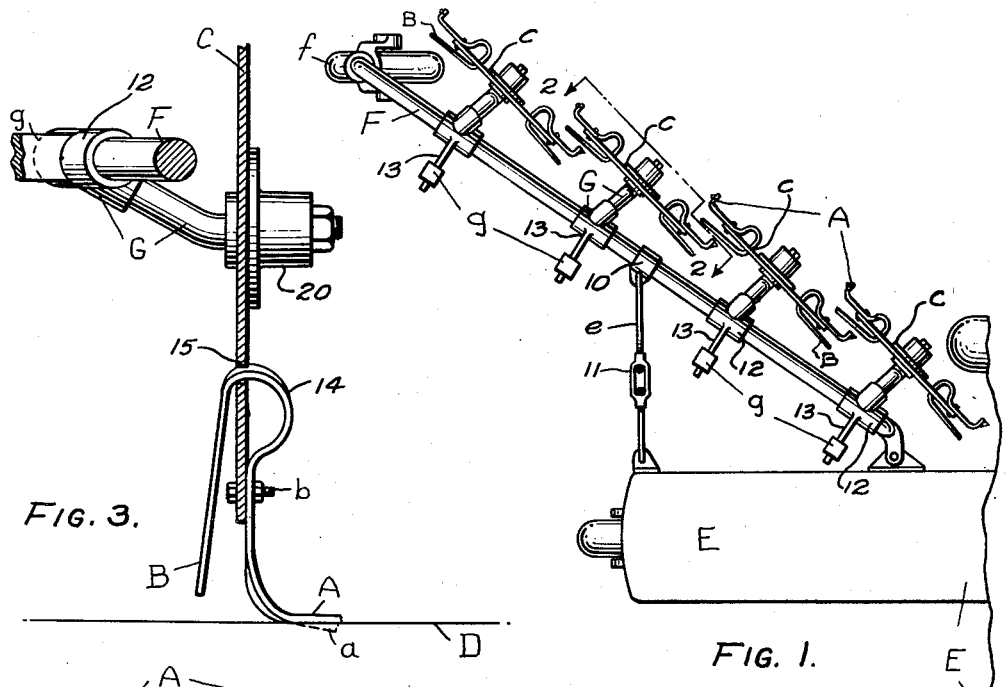
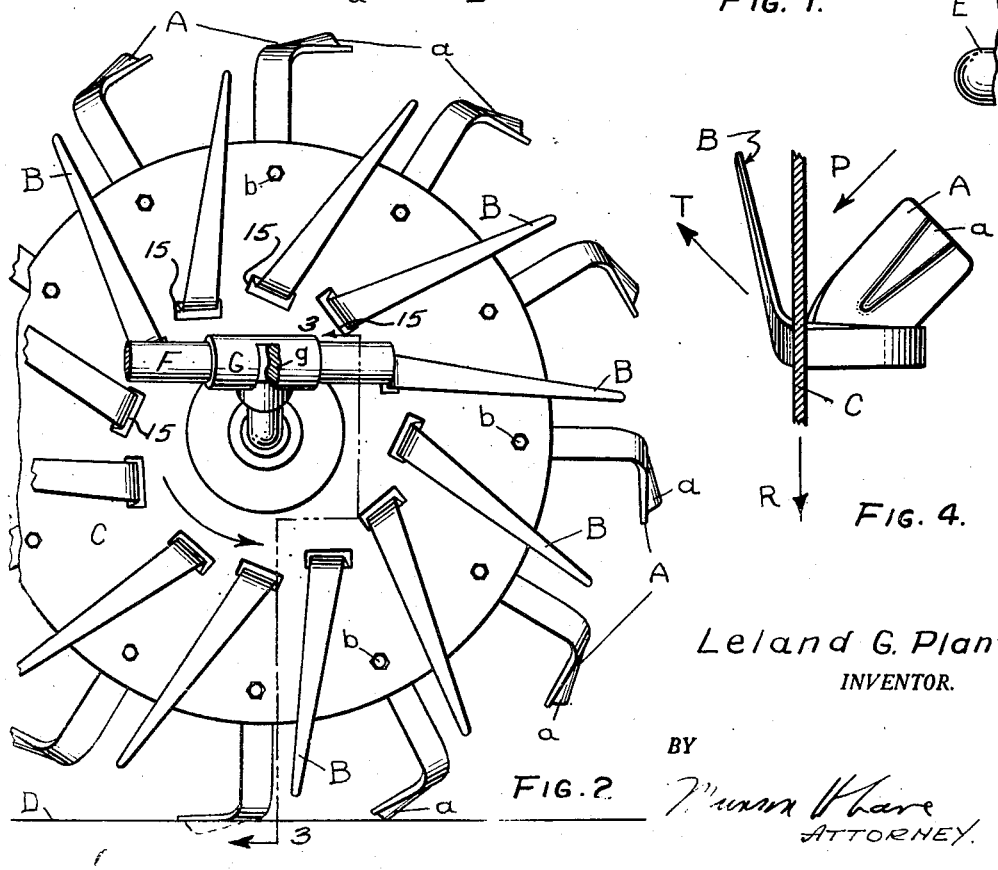
Leland G. Plant
INVENTOR.
BY
*Munson Whare*
ATTORNEY.

March 2, 1954

L. G. PLANT 2,670,588

ROTARY SIDE DELIVERY RAKE

Filed June 16, 1950

Leland G. Plant
INVENTOR.

BY
Munn Hane
ATTORNEY.

Patented Mar. 2, 1954

2,670,588

UNITED STATES PATENT OFFICE 2,670,588

ROTARY SIDE DELIVERY RAKE

Leland G. Plant, Edenton, N. C.

Application June 16, 1950, Serial No. 168,415

14 Claims. (Cl. 56—377)

This invention relates to raking hay with implements of the type that rake the hay into a continuous windrow parallel to the path in which the implement is being drawn or propelled by a tractor. It applies particularly to rakes in which the prongs or tines are rotated in relation to the raking machine by their contact with the ground over which they are dragged, each prong being non-rotatably mounted upon the periphery of a wheel that is free to rotate upon the machine frame in a plane oblique to the direction in which the machine is traveling so that each prong as it contacts the ground tends to scribe a path in the ground surface at an angle to said direction. In these machines the weight of the rotating member may be counterweighted, spring suspended or its pressure upon the ground can be otherwise lessened by positioning its axle so that it will exert an upwardly inclined pull upon the member as it is being drawn over the field. Nevertheless, the action upon which these machines depend requires the prongs to scratch into the ground below the surface over which they are being drawn with the result that a considerable amount of dirt is thrown up and becomes mixed with the hay as deposited in the windrow. This detracts from the value of hay and is objectionable to such an extent that many manufacturers are now disinclined to place this type of implement on the market.

The present invention introduces in combination with raking prongs mounted as above described a means for supporting the tips of these prongs at an approximately uniform height above the ground as they are being drawn over an undulating surface and means for causing them to rotate in the same manner as when the prongs are allowed to dig into the dirt but without the objectionable results above cited. In rakes of the type described to which this invention is applied the tips of raking prongs are supported so that they move through the stubble just below the loosely strewn hay and in a path oblique to the direction in which the machine is being drawn over the field. The means employed in this combination may be a flattened surface which slides easily upon the ground but is preferably corrugated or has a keel tending to resist such sliding except in a straight path oblique to the direction in which the machine is being drawn. Such surfaces are mounted on the rake mechanism so as to move over the ground in the wake of a raking prong or group of prongs and at a fixed elevation in relation to the tips of said prong or group of prongs. These surfaces and prongs are guided so as to rotate about the same or parallel axes. The means here employed are believed to be novel in their application to a raking machine as a combined member both for supporting the prongs at a desired height above the ground and for causing them to rotate in relation to the machine upon which mounted and to tend to move in a straight path over the ground surface at substantially a right angle to the direction in which the machine is being drawn.

My improved raking implement is primarily intended for use with a vehicle-carried wheel-type side-delivery rake, and as herein disclosed comprises a plurality of rotary wheel-like members in overlapping tandem arrangement, said rotary wheel-like members having suitable hubs and peripheral ground-engaging portions and a plurality of raking prongs mounted on the wheel-like members, each prong extending from an intermediate point outwardly to a point inwardly of the ground-engaging portions of the wheel-like member.

Preferably the raking prongs are mounted at an angle both to the plane of the wheel-like member and to the radius of the wheel-like member. The wheel-like member may be provided with skid-like ground-engaging elements equipped with ribbed contours or keels. These skid-like members may be separable from or integral with the wheel-like member, and in a preferred embodiment of the invention both the skid-like members and the raking prongs are formed from resilient bars or strips which are bent intermediate their ends and the prong portions inserted through holes in the wheel-like members, the strips being fastened to the wheel-like member by any suitable fastening means.

The invention is here described in its application to those forms of side row rakes now in use that employ a plurality of overlapping circular members arranged in tandem and each rotating upon an axle separately spaced from the other axles but approximately parallel thereto. The surfaces here employed as a means for supporting the prongs at a desired height above the ground suffice in part to reduce the weight carried upon the frame of the machine and thus simplify the running gear and/or other means for supporting the frame.

The invention will be more readily understood by reference to the accompanying drawings and the following detailed description, in which specific embodiments of the invention are set forth by way of illustration rather than by way of limitation.

In the drawings:

Fig. 1 is a plan view of a portion of a hay raking machine in which the invention is shown applied to the peripheries of a plurality of wheels as resilient means for supporting the raking prongs at a generally uniform height above an undulating ground surface and causing said wheels to rotate as the machine is moved forward so that the prongs describe a path oblique to the direction in which the machine is moving;

Fig. 2 is an enlarged sectional partial elevation viewed in plane 2—2 of Fig. 1, illustrating resilient raking prongs as mounted on a wheel in combination with the resilient means employed by this invention for supporting their tips above the ground and causing the wheel to rotate when drawn over the ground with its axle at an inclination to the direction in which the wheel is being drawn;

Fig. 3 is a fragmentary sectional elevation in plane 3—3 of Fig. 2 showing one design of a raking prong adapted for use on the periphery of a wheel in raking machines of the type that employ a plurality of wheels and illustrating integral resilient means employed in combination with this prong to support it at a fixed height above the ground traversed;

Figure 6:
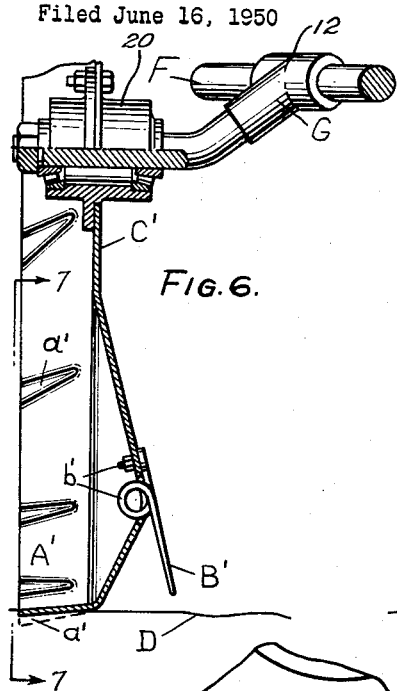
Figure 5:
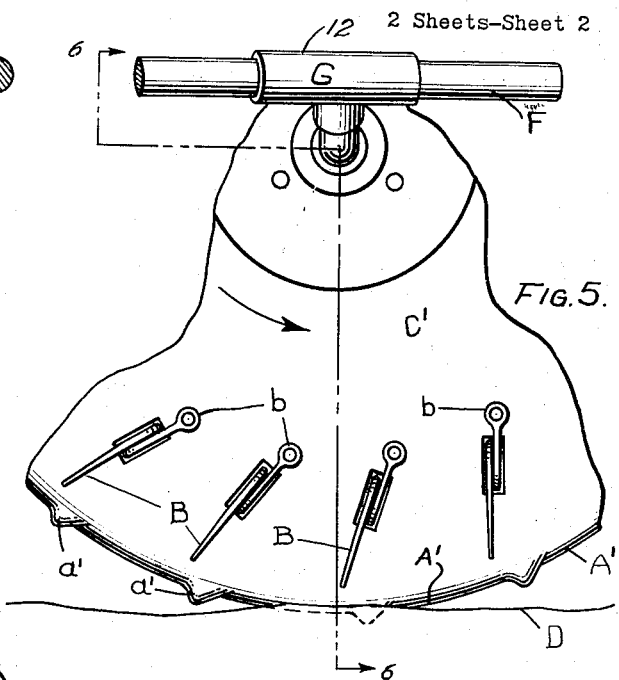
Figure 7:
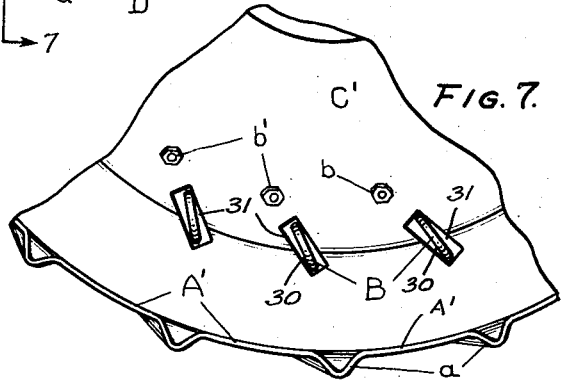
Figure 8:
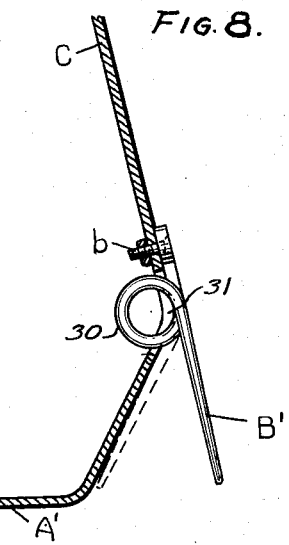
Figure 10:
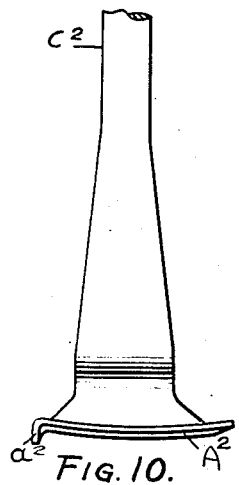
Figure 9:

Fig. 4 is a fragmentary plan view with parts in section showing a detail pattern of the means employed in combination with a raking prong positioned in relation thereto tending to direct it in a path indicated by arrow P upon the ground traversed and causing the wheel on which mounted to rotate in the direction indicated by arrow R as it is being drawn over the ground by a tractor traveling in the direction indicated by arrow T;

Fig. 5 is a partial elevation of a wheel which may be employed in a modification of the invention as the means for supporting raking prongs fastened thereto with their tips at a desired height above the ground traversed, said wheel being mounted as indicated upon a shaft by which it can be drawn forward in a direction angular to its axis;

Fig. 6 is a sectional elevation in plane 6—6 of Fig. 5, showing a pressed disk design to which the construction of this wheel is particularly adapted, the tread being flanged and crimped in the operation to provide integral ribs which may be slanted in the direction to be taken thereby as the wheel is being drawn by its axle shaft in a direction angular thereto;

Fig. 7 is a partial elevation of the wheel viewed from plane 7—7 in Fig. 6 to further illustrate how its flanged tread can be crimped as above described;

Fig. 8 is an enlarged sectional detail showing the design of a straight resiliently mounted prong which can be used with a disk wheel in the modified form of this invention illustrated in Figs. 5, 6 and 7, showing the means proposed for attaching this prong to the wheel whereby its angularity and the height of its tip may be fixed in relation to the wheel tread. More particularly, this drawing shows a means devised for allowing the prong to be forced back against the face of the disk without injury thereto should it encounter a rigid object and then automatically resume its functional position as soon as the pressure thereon is removed;

Fig. 9 is a fragmentary view showing a further modification of the invention wherein the means employed for supporting the tip of each raking prong at a fixed height above the ground traversed is embodied in the construction of the prong itself by flattening and shaping its extremity as shown; and Fig. 10 is another elevation of the modified prong viewed from plane 10—10 of Fig. 9, showing how the round bar stock of this prong may be flattened and shaped to combine in one piece both the tip of a raking prong and means tending to direct its path upon the ground in a direction toward which it is pointed.

Referring first to Fig. 1, E denotes generally a carrier vehicle such as a farm tractor or the like, to which the raking implements of the invention may be attached in any suitable manner, either for towing or pushing by the carrier vehicle. As shown, a frame structure comprising a rod F is employed for supporting the raking implements, one end of the rod F being shown hingedly attached to the carrier vehicle E, while the portion of the rod beyond the hinged part may be supported by suitable running gear herein shown as comprising a swivelly mounted wheel f, though additional supporting devices may be employed if desired. The implement carrying frame member or rod F may be held in any desired angular position with reference to the carrier vehicle E by means of adjustable connecting rod e secured at one end to the carrier vehicle E and provided at its other end with a collar 10 fitting the frame member F. The length of the connecting rod e may be adjusted by means of a turnbuckle or the like 11. A plurality of raking implements comprising rotary wheel-like members C are shown carried by the frame member F in overlapping tandem arrangement and at an oblique angle with reference to the direction of movement of the carrier vehicle. The wheel-like members C are provided with suitable bearing hubs 20 mounted on shafts G which in turn are provided with collars 12 fitting the rod or frame member F. The shafts G may be provided with extensions on the opposite sides of the collars 12 carrying counterweights g whereby a portion of the whole weight of each wheel may be carried by the frame member F and transmitted by said frame member to the carrier vehicle E and running gear f.

The wheel-like members C may be of the disk type herein illustrated or may be of the rim and spoke type (not shown), and are adapted to carry ground-engaging portions A and raking prongs or tines B. The ground-engaging members A and the prongs or tines B may be made as a unit 14 as shown in Figs. 1 to 4, such unit being preferably formed of strong resilient material such as a thin strip or bar of forged steel, which is suitably bent intermediate its ends to the form shown in these figures. The wheel-like member C is provided with a plurality of openings 15 to permit assembly of the units 14, which units may be secured to the wheel-like member C by any suitable attaching means b. As shown the ground-engaging members A are turned outwardly and are angularly disposed with reference to the plane in which the wheel-like member A rotates.

Each of the ground engaging members A is shown as provided on its under surface with a rib or ridge a and the members A are so shaped as to slide easily upon the ground in the direction of the rib a while resisting sliding in a direction at right angles to the rib. As will be apparent from Figs. 2 and 3 the raking prongs B terminate short of the ground-engaging portions A so that the ends of such prongs will be maintained at a desired height above the level of the ground indicated at D.

In Figs. 5 and 6 a modified form of wheel-like member C' is shown, it being understood that a plurality of such members are intended to be mounted in overlapping tandem relation on a vehicle carried frame member F in the manner disclosed in Fig. 1. The wheel-like member C' is provided with ground-engaging portions A', and as shown is of disk design having a flanged tread portion which may be crimped in the course of the flanging operation to provide integral ribs $a'$ which may be slanted in the direction to be taken thereby as the wheel is drawn by its axle shaft in a direction angular thereto.

In Figs. 5 to 8 the raking prongs are designated B' and are shown as secured to the wheel-like member C' by any suitable fastening means $b'$. Such prongs or tines may be of resilient material and each is shown as provided intermediate of its ends with a loop portion 30 which projects into an opening 31 in the wheel-like member C'. By reason of the construction and mounting of the prongs B' any prong may be forced back against the face of the wheel as indicated in dotted lines in Fig. 8, without injury thereto should it encounter a rigid object. The ends of the prongs B' terminate short of the ground-engaging portions of the wheel-like member C' and are shown mounted at an oblique angle with reference to the radius of the wheel-like member.

In the modification shown in Figs. 9 and 10, $C^2$ represents a spoke of a wheel-like member rotatable upon a suitable hub (not shown), which wheel-like member is adapted to be mounted upon a carrier vehicle in a manner similar to that illustrated in Fig. 1 in connection with the wheel-like members C, and $A^2$ represents one of the ground-engaging portions of the wheel-like member provided with a rib or ridged portion $a^2$, while the raking prong is indicated at $B^2$, such prong being supported at a fixed height above the ground by means of the ground-engaging portion $A^2$ and rib $a^2$.

Several embodiments of the invention have been described in detail for the purpose of illustration, but it will be obvious that further modifications and variations may be resorted to without departing from the spirit of the invention.

I claim:

1. A vehicle carried side delivery rake comprising a frame structure adapted to be secured at an oblique angle to a carrier vehicle, and comprising an elongated supporting member of circular cross section, a plurality of raking implements supported from said frame structure, each said raking implement including an axle shaft extending outwardly from the elongated supporting member, and a ground engaging raking implement rotatable about said axle shaft, each raking implement being provided with a plurality of prongs rigidly secured at an oblique angle with reference to the radius of the rotary implement and terminating short of the periphery thereof, and collar means for individually attaching said axle shafts to the elongated supporting member to permit individual adjustment of the raking implements as the vehicle passes over irregularities in the ground.

2. A side delivery rake as set forth in claim 1 wherein each of the raking implements is counterweighted in part at least.

3. For use in a vehicle carried wheel-type side delivery rake, a raking implement comprising a rotary wheel-like member having a suitable bearing hub and ground-engaging elements mounted peripherally thereof, a plurality of raking prongs mounted on said wheel-like member and each extending from an intermediate point outwardly to a point inwardly of said ground-engaging elements.

4. A rake as set forth in claim 3 wherein each of the prongs is rigidly secured at an oblique angle to the radius of the rotary ground-engaging member.

5. A rake as set forth in claim 3 wherein the raking prongs are mounted at an angle to the plane of the wheel-like member.

6. A rake as set forth in claim 3 wherein the raking prongs are mounted at a fixed angle to the radius of the wheel-like member.

7. A rake as set forth in claim 3 wherein the wheel-like member is provided with openings and the ground-engaging members extend through said opening and terminate in said raking prongs.

8. A rake as set forth in claim 3 wherein the raking prongs are resiliently mounted on the wheel-like member directionally and structurally separate from the skid-like members.

9. A rake as set forth in claim 3 wherein the ground-engaging elements lie in a surface angularly disposed to the plane in which said wheel-like member rotates.

10. A rake as set forth in claim 3 wherein the ground-engaging elements are extensions of the raking prongs.

11. For use in a vehicle carried wheel-type side delivery rake, a raking implement comprising a rotary wheel-like member having a suitable bearing hub and skid-like ground-engaging elements mounted peripherally thereof, a plurality of raking prongs mounted on said wheel-like members and each extending from an intermediate point outwardly to a point inwardly of said ground engaging elements.

12. A rake as set forth in claim 11 wherein the skid-like elements are formed integral with the wheel-like member.

13. A rake as set forth in claim 11 wherein the skid-like ground-engaging elements have ribbed contours, the ridges thereof being angularly disposed to the plane in which said wheel-like member rotates.

14. A rake as set forth in claim 11 wherein the skid-like ground-engaging elements are formed upon structural extensions to the raking prongs.

LELAND G. PLANT.

References Cited in the file of this patent

UNITED STATES PATENTS

| Number | Name | Date |
|---|---|---|
| 1,103,419 | Kaasa | July 14, 1914 |
| 1,412,359 | Lacy | Apr. 11, 1922 |
| 1,467,999 | Brown | Sept. 18, 1923 |
| 2,447,354 | Morrill | Aug. 17, 1948 |
| 2,472,260 | Morrill | June 7, 1949 |
| 2,532,652 | Wray | Dec. 5, 1950 |